(12) United States Patent
Jellum et al.

(10) Patent No.: US 8,396,903 B2
(45) Date of Patent: Mar. 12, 2013

(54) METHOD AND SYSTEM FOR ORGANIZING AND RETRIEVING ENERGY INFORMATION

(75) Inventors: Edgar Jellum, Asker (NO); Jan Wiik, Oslo (NO); Ole Jacob Soerdalen, Sandvika (NO); Trond Haugen, Oslo (NO); Vidar Hegre, Asker (NO)

(73) Assignee: ABB Research Ltd., Zürich (CH)

( * ) Notice: Subject to any disclaimer, the term of this patent is extended or adjusted under 35 U.S.C. 154(b) by 993 days.

(21) Appl. No.: 10/544,807

(22) PCT Filed: Feb. 6, 2004

(86) PCT No.: PCT/EP2004/001092
§ 371 (c)(1),
(2), (4) Date: May 8, 2006

(87) PCT Pub. No.: WO2004/070491
PCT Pub. Date: Aug. 19, 2004

(65) Prior Publication Data
US 2006/0248032 A1    Nov. 2, 2006

(30) Foreign Application Priority Data
Feb. 7, 2003   (SE) ........................... 0300353

(51) Int. Cl.
*G06F 7/00* (2006.01)
*G06F 17/30* (2006.01)

(52) U.S. Cl. ..................... 707/804; 707/805
(58) Field of Classification Search ............... 707/804, 707/805
See application file for complete search history.

(56) References Cited

U.S. PATENT DOCUMENTS
6,182,249 B1   1/2001   Wookey et al.
2003/0005486 A1 *   1/2003   Ridolfo et al. ........... 800/288
2003/0023518 A1 *   1/2003   Spriggs et al. .......... 705/28
2003/0041135 A1 *   2/2003   Keyes et al. ............ 709/223

FOREIGN PATENT DOCUMENTS
WO    WO 0102953 A1    1/2001

OTHER PUBLICATIONS

Don Batory and Sean O'Malley; The Design and Implementation of Hierarchical Software Systems with Reusable Components; AMC Transactions on Software Engineering and Methodology; Oct. 1, 1992; pp. 355-398; vol. 1, No. 4; Association for Computing Machinery; New York.

Ivar Jacobson; Object Oriented Development in an Industrial Environment; Special Issue of Sigplan Notices; Dec. 1987; pp. 183-191; vol. 22, No. 12; Orlando.

* cited by examiner

*Primary Examiner* — Mariela Reyes
(74) *Attorney, Agent, or Firm* — Venable LLP; Eric J. Franklin

(57) ABSTRACT

A method and a system for organizing and retrieving energy related information for a plurality of real world objects, wherein a number of information types are defined, each information type representing different kind of energy related information. The method includes providing one or more predefined interfaces adapted for retrieval of information of the information types, providing software objects, representing the real world objects, having at least one interface for retrieval of information of at least one of the types, based on the one or more predefined interfaces, arranging the software objects in a hierarchal structure including more than one level, so that the software objects obtain a parent-child relation, receiving and storing information about where to find the source of the information to be retrieved via the interfaces of the software objects.

30 Claims, 5 Drawing Sheets

Category: Electricity Consumption — Value —23
22—

| Source Type Specifies | Genereal Parameters | Opportunities | 35 |

Opportunity Descrisption

Short Title: Turn off Motor     Subscribe to Opportunity Flag

Detailed Description: Motor can be turned off during low load due to its function in process...

Opportunity Expression

OPC Property Connection

33—

| Short Name | Property ID |
|---|---|
| A | Functional Structure: : Electricity Consumption: Value |
| B | Functional Structure: : Product Data: Rated Power |

Add Variable
Remove Variable

Expression [     ]—32

Category: Electricity Consumption — Value —23
22—

| Source Type Specifies | Genereal Parameters | Opportunities |

Source Type [Aggregated ▼]

Source Types to be aggregated:
- Metered
- Calculated
- Aggregated

Structure to aggregate: [Functional Structure ▼]

Level of aggregation: [▼]

Type of aggregation: [Summation ▼]
- Summation
- Average
- Weighed Average

*Fig. 10*

Category: Efficiency

Value — 40

| Source Type Specifies | Genereal Parameters | Opportunities |

Source Type    [Calculated ▼]

Property Path  [          ]    [Browse for Property h]

Fig. 11

METHOD AND SYSTEM FOR ORGANIZING AND RETRIEVING ENERGY INFORMATION

FIELD OF THE INVENTION

The present invention relates to a method and a system for organizing and retrieving energy related information for a plurality of real world objects. The invention is useful in any area where energy is converted, distributed and/or consumed, such as in process industries, power plants or buildings. The invention is particularly suitable for organizing and retrieving energy related information, but is also suitable for organizing and retrieving other types of information such as environmental information.

The present invention also relates to a computer program product directly loadable into the internal memory of a computer, comprising software code portions for performing the steps of the method according to the invention, when said product is run on a computer.

The present invention also relates to a computer readable medium having a program recorded thereon, where the program is to make a computer perform the steps of the method according to the invention when said program is run on the computer.

The present invention also relates to use of a system according to the invention for organizing and retrieving energy related information in a control system controlling said real world objects.

The invention further relates to a man machine interface for organizing and retrieving energy related information for a plurality of real world objects.

PRIOR ART

Today, energy related information and environmental data for process objects in a process industry often resides in a number of different systems serving different purposes. Examples of such systems are process control systems, systems for process simulations and optimization, metering systems, lab data systems and utilities control systems. Examples of information to be found in such systems are energy consumptions, energy losses, efficiencies, energy costs, availability, component ratings (e.g. electric motors), data representing basic emissions with environmental impact, such as CO, $CO_2$. The object is any object that consumes or converts energy, for instance a motor, a gas turbine or a pump.

It is most often the case that all data relevant to energy information, and even more so in regard to environmental information, resides in a number of different and separate systems. Generally speaking different computerised systems supplied by different manufacturers do not exchange or communicate data with other computerised systems without special intervention, fixes, adjustments or other custom routines for each system. This presents a problem in accessing technical information that resides in different systems such as maintenance systems, production control systems, control systems and so on. This problem is particularly severe in larger and more complex installations where technical data exists for thousands of components but is stored in separate systems. Typically it is difficult to overview the information to enter that data, as well as to navigate, analyze and present the right information to a specific user or for a specific task. Configuring a new process section for advanced automatic control becomes a major project and even adding one more pump leads to a lengthy configuration job for specialists. In short, to organize, enter, maintain and retrieve energy related technical information related to a specific component or other process object is difficult, time consuming and error prone.

Energy and environmental management is performed on many different levels in an organization, each level requiring it own level of detail of the information. Thus, it is a desire to be able to display energy information on different levels. For example, it is desired to be able to display the energy consumption for the entire plant, as well as for each individual object in the plant. Although different tasks and users require different information, most of the information can be derived from the same core energy data related to different process objects. Examples of such core energy data are: energy consumption, energy losses, energy efficiency, energy availability and additional quality data. This core information will typically be found in different subsystems, and will have to be integrated to provide the complete picture. Another desire in connection with organizing and retrieving energy information is that the system should have a quick and easy way to search through the information, for example to look for possibilities to make improvements.

The traditional way of organizing and retrieving information is to use a relational database. By means of a relational database it is possible to search for information residing in different systems. However, there are some severe drawbacks with using relational databases to organize and retrieve energy information. A solution using a relational database will impose higher cost of entry, require higher maintenance effort, and be less flexible in accommodating extensions and changes in user requirements.

In control systems it is known to represent real world objects with software objects. The real world object may be a single device, an object in a process or complete equipment. Such a control system is disclosed in the international application WO 01/02953, hereby incorporated in entirety by reference. The software objects to be controlled are represented as first software objects called composite objects. The system also includes second software objects called aspect objects, which represent data and/or operations of the real world object. The aspect objects are provided with an interface for entry of and retrieval of data and for invoking functionality. The composite object is a container holding at least one aspect representing data for the real world object. The composite object includes information leading to one or more interfaces of aspect objects.

OBJECTS AND SUMMARY OF THE INVENTION

An object of the present invention is to provide an improved method for organizing and retrieving energy related information for a plurality of real world objects, which makes it easier to overview the information, makes it possible to view information on different levels of detail, and which achieves improved search possibilities.

This object is achieved by a method according to the invention, wherein a number of information types are defined, each information type representing different kind or kinds of energy related information. The method comprises providing one or more predefined interfaces, adapted for retrieval of information of said information types, providing software objects, representing the real world objects, having at least one interface for retrieval of information of at least one of said types, based on said one or more predefined interfaces, arranging said software objects in a hierarchal structure comprising more than one level, so that the software objects obtain a parent-child relation, receiving and storing information about where to find the source or sources of the information to be retrieved via said interfaces of the software objects, and providing, upon request, information of a selected type for a selected object via said interface of the software object. It is particularly advantageous to use the method according to the invention to manage energy data in a control system, which is controlling said real world objects.

The definition of information types achieves a clear identification of specific pieces of energy related information and the predefined interfaces provide a defined way of accessing information for all objects. Different objects may have different sources for the same type of information. The information can be configured to come from any source, including real time measurements, process models, simulation tools, and web sites. Information belonging to the same type is accessed in the same way for each object independent of the source of the information.

Thanks to the fact that the information is accessible from an interface of a software object representing the real world objects, the software objects and accordingly the information can be arranged in hierarchal structures reflecting the natural structure of the objects. For example a first level comprises an object representing the entire plant, a second level comprises objects representing process sections of the plant, and a third level comprises objects representing physical objects of the process section. By going down the structure, greater level of detail can be obtained for different information types. The hierarchal structure simplifies navigation and search for specific information and provides a good overview of the available information.

People on different levels in an organization, having different responsibility areas, can thus easily find required information and the information can be displayed on a desired degree of detail.

The invention also makes it possible to perform arithmetical operations on information of information belonging to the same information type for selected objects or objects on the same level in the hierarchal structure. Thus, the method according to the invention makes it possible to organize information from a number of heterogeneous systems and information sources.

The invention makes it possible to run advanced searches through the structure. Such advanced searches is for example to find all motors that have a lower loading than 10%, or to find all pumps with efficiency below its target value. Thus, the improved search possibilities can lead to specific process control actions, which can improves the performance of a system.

The hieratical structure also makes it easy to add an object to the system and to delete an object from the system. Advantages gained with a method according to the invention, compared to traditional solutions, is more flexibility, and easier to use. For example, the user can easily add drilldown patterns, and organize the software objects in new structures, in dependence of responsibility domains or cost allocations. Another advantages gained by the invention are easier access to energy related information, and thus better utilization of available information, and simpler navigation in an information structure.

An interface is a defined set of accessible properties and methods. The interface has one or more entries for accessing the properties and methods. Each of the predefined interfaces comprises at least one property denoted value, which returns a value of the defined information type. The information types are for example electricity consumption (W), electricity production (W), gas consumption (m.sup.3/h), efficiency (%), energy consumption (J/hour), energy loss (J/hour), and $CO_2$ (kg/hour) emission. The interface also comprises a definition of a graphical user interface through which the user accesses the methods and properties and sets the source of the information. The information provided via the interface in for example one or more values, a text string or a pointer to the information.

According to an embodiment of the invention the method comprises providing a number of predefined interfaces, each interface representing a different information type, and providing each of said software objects with one or more interfaces for retrieval of information of different types, based on said predefined interfaces. All interfaces of the same information type are based on the same predefined interface and therefore interfaces of the same information type are identical. This embodiment achieves a high flexibility due to the fact that each software object can be provided with different interfaces depending on the information types needed by the object. For example a gas turbine may be provided with interfaces for the information types: gas consumption, efficiency, and energy consumption and a pump may be provided with interfaces for the information types: electricity consumption, efficiency, and energy loss.

According to an embodiment of the invention the method comprises providing at least one information class defining an interface for retrieval of information, wherein at least some of said predefined interfaces are based on said information class. By providing an information class defining an interface for retrieval of information, and basing more than one of the predefined interfaces upon the information class, the predefined interfaces inherits the interface, i.e. the properties and the methods, of the class. This ensures that interfaces based on the same class are equal. Accordingly, interfaces of different typed which belong to the same class are at least partly equal. It is advantageous for the user if the interfaces are as similar as possible.

According to an embodiment of the invention the method comprises selecting a set of objects, a type of information, and an arithmetic operation, retrieving information of said selected type from the software objects representing the selected objects, and performing the arithmetic operation on the retrieved information. The arithmetic operation performed is preferably an aggregation operation. Thus, it is possible to aggregate values belonging to the same information type for a selected set of objects. The aggregation operation is for example summing the retrieved information, calculating a mean value or a weighted average based on the retrieved information.

According to an embodiment of the invention the method comprises arranging said software objects in at least two different hierarchal structures, wherein at least some of the software objects belong to both structures. Thus, it is possible to view the information structured in different ways. For example the objects can be structured due to their physical location in relation to each other or due to their functional relationship.

According to an embodiment of the invention the method comprises retrieving information of a specific information type for an object of a higher level by means of retrieving information of said specific information type from software objects on a lower level or lower levels and performing one or more arithmetic operations on the retrieved information. Preferably, said information is retrieved automatically. The arithmetic operation performed is for instance an aggregation operation. By using the hierarchical structures information for an object of a higher level can be retrieved by aggregation of information from objects on lower levels, one or more levels down. For example if the total electricity consumption for a process section is wanted, objects on a lower level, which are children to the object representing the process section, are traversed and values of electricity consumption are retrieved via interfaces of the information type electricity consumption and the values are added together.

If a new object is added to the system, having one or more interfaces for the specific information types, said values are automatically found by software objects higher up in the hierarchy and aggregated to the other values of the same type. Thus, the information in the system is automatically updated when a new object is added. Which of the objects are aggregated depends on the hierarchal structure. If the objects are arranged in more than one hierarchal structure, different types of aggregation can be achieved. For example, the objects are arranged in a first structure representing the location of the objects and a second structure representing any functional relationship of the objects. In the first structure a software object on a higher level for example represents a building in a plant and software objects on lower levels represent real world objects located in that building. The total electricity consumption in the building is obtained by summation of values of the information type electricity consumption for all software objects on lower levels. In the second structure a software object on a higher level for example represents a reactor and software objects on lower levels represent object such as motors and pumps belonging to the reactor. The total electricity consumption of the reactor is obtained by summation of values of the information type electricity consumption for all software objects on lower levels.

According to an embodiment of the invention the method comprises distributing information from an object on a higher level to software objects on a lower level. By using the hierarchical structure information of higher level objects can be distributed to lower lying objects according to a distribution algorithm. For example overall electricity consumption measurement for a process section can be distributed to objects of the process section based on rated power of all the electricity consumers in the process section. This can be done by first identifying all electricity consumers by seeing if they have an interface of the electricity consumption type, if they have such an interface find the interface of the rated power type and access their values, distribute the total electricity of the process section for all the electricity consumers identified according to a distribution algorithm.

According to an embodiment of the invention the method comprises providing at least some of the software objects with at least one target value of a certain information type, and comparing an actual value of the same type with the target value and generating an alarm or an event based on the comparison. For each information type of an object, target parameters can be set. Energy performance can be monitored by comparing the actual value and the target value and an alarm or an event can be generated based on the comparison.

According to an embodiment of the invention the method comprises checking whether there is a consistency between the target of a parent software object and the targets of its child software objects. By using the hierarchal structure a consistency check of the targets between different levels of the structure is automatically performed.

According to an embodiment of the invention the method further comprises defining a number of software object templates, each software object template provided with one or more predefined interfaces for retrieval of information of different types and creating software objects based on said software object templates. For different real world objects, different object types can be defined with a predefined set of interfaces of different information types. This simplifies and speeds up the population of the structures describing a plant, for example when creating a new object defined interfaces of the object type will automatically be generated.

According to an embodiment of the invention the method comprises defining at least one logic and/or arithmetic expression regarding an opportunity for improvement of an energy related management operation, and providing said predefined interface with an indication of a possibility for improving the operation based on said logic and/or arithmetic expression. Thus, the system indicates if there comes up a possibility to improve the operation for one or more objects. For example, it is possible to indicate if an opportunity to save energy for an object arises.

According to an embodiment of the invention the method comprises providing at least one predefined interface comprising at least two entries for retrieval of information of two different types. Thus, it is possible to have only one predefined interface having an entry for each information type and thereby the implementation of the method is simplified.

Another object of the present invention is to provide an improved computer program product and a computer readable medium having a program recorded thereon, for organizing and retrieving energy related information for a plurality of real world objects.

A further object of the present invention is to provide an improved system for organizing and retrieving energy related information for a plurality of real world objects. This object is achieved by a system characterized in that a number of information types are defined, each information type representing different kind or kinds of energy related information, and the system comprises: at least one template comprising a definition of an interface for retrieval of information of said information types, means for providing software objects, representing the real world objects, having at least one interface for retrieval of information of at least one of said types, based on said template, means for arranging said software objects in at least one hierarchal structure comprising more than one level, so that the software objects have a parent-child relation, a source defining module, adapted for receiving and storing information about where to find the source or sources of the information to be retrieved via said interfaces of the software objects, and means for, upon request, providing information of a selected type for a selected object via said interface of the software object.

The system further comprises means for adding new software objects to the hierarchal structure and means for deleting said software objects from the hierarchal structure. Preferably, the system also comprises means for moving the software objects within the hierarchal structure and/or between the hierarchal structures.

The system comprises a number of modules. A module is a component that implements some functionality, which can be embodied as software, hardware, firmware, electronic circuitry or combinations thereof.

A further object of the present invention is to provide an improved man machine interface for organizing and retrieving energy related information for a plurality of real world objects.

An aspect of the invention is a method for providing values for energy use for a plurality of real world objects, wherein a number of information types are defined, each information type representing different kind or kinds of energy related information, and the method comprises: providing one or more predefined interfaces, adapted for retrieving values of said information types, providing software objects, representing the real world objects, having at least one interface for providing at least one value of one of said information types, based on said one or more predefined interfaces, receiving and storing information about where to find the source or sources for energy data to be retrieved via said interfaces of the software objects, and providing, upon request, a value of a selected information type for a selected object via said interface of the software object, based on said retrieved energy data.

BRIEF DESCRIPTION OF THE DRAWINGS

The invention will now be explained more closely by the description of different embodiments thereof and with reference to the appended figures.

FIG. 9 shows an example of an interface of category electricity consumption.

FIG. 10 shows the interface of FIG. 9 when source type aggregated is selected.

FIG. 11 shows an example of an interface of category efficiency.

DETAILED DESCRIPTION OF PREFERRED EMBODIMENTS OF THE INVENTION

Software objects, in the following denoted process objects, represent real world objects. A process object is a container of information related to the real world object. Each process object is identified by a unique number, which is called an object identifier (OI). The real world object, which the process object represents, is, for example, a plant, a process section, a pump, or a motor. For many of the process objects there exists energy related information and environmental information, which reside in a number of different systems, which are all linked to each other in some way. The systems are, for example, power management systems, maintenance systems, process control systems, systems for process simulation and optimization. Examples of such information are efficiency curves, load characteristics, energy consumption logs, ratings for electric motors and energy costs.

A method and a system according to the invention make it possible to organize and retrieve information for a specific process object. To organize the information, a number of information types are defined which represent different types of energy and environmental information. Examples of information types are electricity consumption, efficiency, energy loss, specific fuel consumption (energy consumption per output product), gas consumption, steam consumption, total energy consumption, energy cost, reactive power consumption, reactive power production, power quality and contribution, availability, component capacity, component rating, air emission ($CO_2$), emission to water, and waste. Further, a generic interface for retrieval of the information is defined.

The process objects are organized in hierarchal structures and the structures are utilized to traverse all the process objects as well as to retrieve and aggregate information of the same type.

Figure 1:
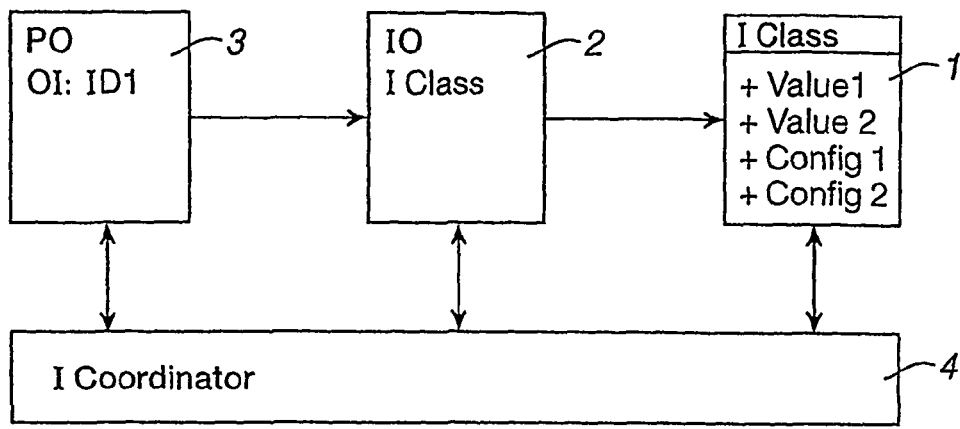
FIG. 1 shows a first embodiment of a system and method for organizing and retrieving information according to the invention.

FIG. 1 shows a first embodiment of the invention. A generic interface is providing by defining a fixed information class that implements the information access of the individual process objects. The information class defines a number of exposed properties and methods for retrieval of the information. The exposed properties comprise values of different information types and the methods comprise methods for specifying where to find the source or sources of the information to be exposed. The first embodiment shown in FIG. 1 has one information class 1 defining an interface comprising a first property, denoted value 1, which returns a value of a first information type, and a second property, denoted value 2, which returns a value of a second information type. The information class is a template, based upon which software objects can be created. Software objects created based upon an information class comprise an interface having the properties and methods defined by the information class.

An information object 2 is a software object created based on the information class having an interface as defined by the information class. Thus, all information objects created based on the same information class have identical interfaces. In FIG. 1 an information object 2 is created based on the information class and a process object 3 is associated with the information object. Accordingly, the process object is provided with the interface defined by the information class 1. The system is also provided with an energy information coordinator 4. The object of the energy information coordinator 4 is to store all process object information as well as store and provide configuration data for the individual process objects. This embodiment provides only one fixed class that implements the energy information access for the individual process objects and only one configuration of this class is available for each process object.

Figure 2:
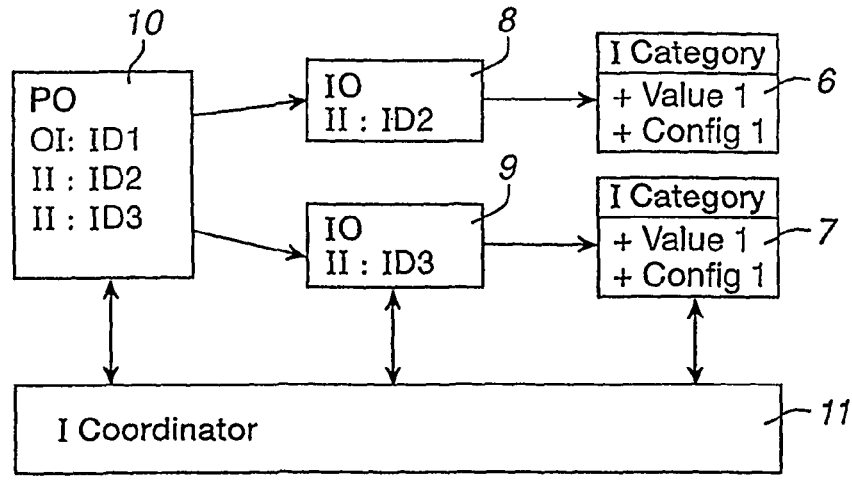
FIG. 2 shows a second embodiment of a system and method for organizing and retrieving information according to the invention.

FIG. 2 shows a second embodiment, which is more flexible. In this embodiment, for each of the predefined information types is one information category 6, 7 is defined. The information category is a template and defines an interface having a number of exposed properties and methods for retrieval of information of a specific information type. The template comprises a text file that defines all input and output properties of the interface. In the text file, a "macro" can also be connected to some of the defined properties. This macro will make the configuration type of properties correspond to the output type of properties. An information object 8, 9 is a software object created based on an information category 6, 7, having an interface, as defined by the information category, for retrieval of information of a specific information type.

A process object 10 could be provided with one or more information objects 8, 9 based on different categories 6, 7. Information of a specific information type is accessible through the interface of the information object 8, 9 created based on the information category for that specific information type. Energy information of a specific type is retrieved via the interface of that information type. The system comprises an energy information coordinator 11, which handles all process object information and information object information and category information. When an information object is activated and information is retrieved, the energy information coordinator is able to run the macro and provide the information requestor with the accessed value.

A third and preferred embodiment of the invention comprises at least one information class and a plurality of information categories. The information class provides a predefined interface for retrieval of information and for configuration of the information objects. The predefined interface defines a number of exposed properties and methods for retrieval of the information. Each information category is based on an information class and thus inherits the interface defined by the class. For each of the predefined information types, one information category is defined. Information objects are created based on the information categories.

Figure 3:
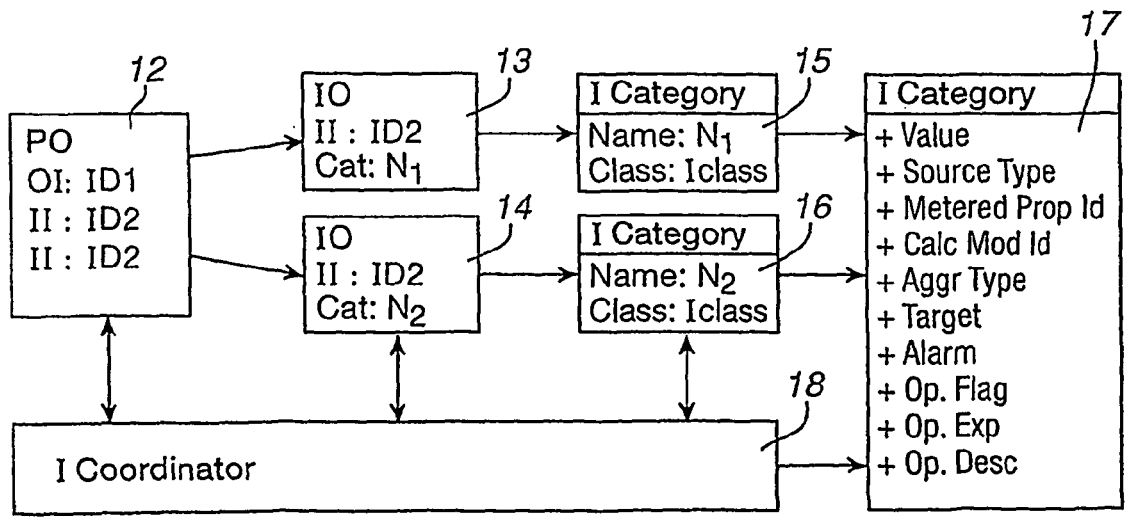
FIG. 3 shows a third embodiment of a system and method for organizing and retrieving information according to the invention.

The FIG. 3 shows a process object 12 provided with two information objects 13, 14. The information object 13 has an interface for retrieval of information of the electricity consumption type and the information object 14 has an interface for retrieval of information of gas consumption type. The information object 13 is created based on an information category 15, adapted for retrieval of information of the electricity consumption type. The information object 14 is created based on an information category 16, adapted for retrieval of information of the gas consumption type. The information category 15 provides a template that defines an interface for retrieval of information of the electricity consumption type, and the information category 16 provides a template that defines an interface for retrieval of information of the gas consumption type. The information category templates are based on an information class 17, which provides a predefined interface for retrieval of information and for configuration of the information objects.

In this embodiment, the same class is used to implement all the information categories. However, in another embodiment it is possible to define more than one information class and some of the information categories are based on one information class and other categories are base on another information class. An advantage with having one or more information classes, defining the interface of the information categories, is that all categories of the same class will have equal interfaces, which simplifies access of the information for the user. An instance of the class can be accessed through a given interface. The exposed properties and methods of the interface are:

Value—is the value of the piece of information to be exposed. The source of this piece of information depends on the Source Type and the thereto-belonging source information.

Source type—Sets the type of information. The different types available are metered, aggregated, and calculated.

Metered Property ID—For a source type of metered, this property defines the identity of the metered value to be exposed through the property value.

Calculated Model ID—Describes from which process model the calculated value to be exposed through value comes from.

Aggregated type—Type of aggregation to be performed if the source type is set to be aggregated, e.g. summation, average, weighted average.

Target—Sets what the target is for this property. This property may also be connected to an external property.

Opportunity Flag—Indicates whether there is an opportunity or not.

Opportunity Expression—Is an expression being evaluated to define the opportunity flag.

Opportunity description—Describes the type of opportunity that corresponds to an opportunity expression.

Figure 4:
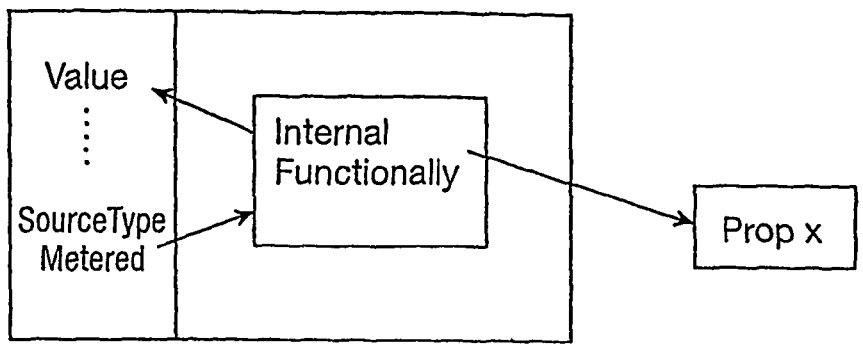
FIG. 4 shows how source data is collected and exposed through the interface.

The definition of a class comprises several internal functionalities, which ensure that the interface properties regarding configuration corresponds to the interface properties that must be evaluated. The first main internal functionality is illustrated in FIG. 4. When the property named value is accessed from an object of this class, the object first reads its configuration parameters regarding the source of the information. If the source type is set to be metered, the Metered Property ID is used to connect to the corresponding property x. The value returned to the value requester is set to equal the value of the property x. Access to a property x can be implemented in several ways, e.g. access to the property via an OPC-server. OPC(OLE (Object Linking and Embedding) for Process Control) is a standard protocol for communication between industrial devices and/or computers. As shown in FIG. 4, the interface comprises an output denoted value, and an input denoted source type, and an input denoted Metered Property ID. The internal functionality is supplying exposed properties with source defined properties.

Figure 5:
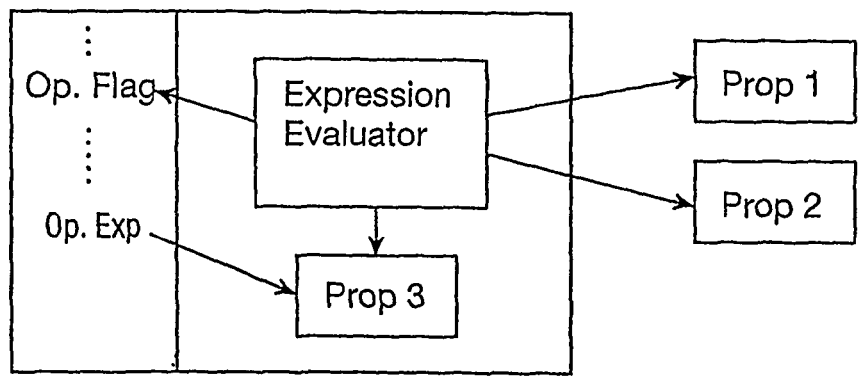
FIG. 5 shows evaluation of an opportunity expression.

Another internal functionality defined in the class is illustrated in FIG. 5. Here, the value of the exposed property opportunity flag is evaluated. The interface defining the class comprises an output denoted opportunity flag, and an input denoted opportunity expression. The internal functionality defined by the class comprises "get the properties in the expression", in this example property 1 and property 2, "evaluate the expression" and "set opportunity flag=result". The evaluated expression is equal to property 3.

Software objects called process objects are set to represent real-world objects. Information about the existence of these process objects is kept in an energy information coordinator 18 (FIG. 3). New process objects can be added and removed from the energy information coordinator. Each process object has a unique identification called the object identifier (OI). Information objects are software objects created based on an information category. One or more information objects can be connected to a process object. Each information object has a unique identifier, called information identifier (II). An information object is based on an information category. The information coordinator knows which information objects are connected to which process object and which information category the information objects are based on. The information coordinator also stores configuration parameters of the information object. The class that the information category is based on defines these configuration parameters.

The information coordinator comprises software modules providing the following functionality:

Returning an instance of an information class of a given information object with its stored configurational parameters.

Storing all system configuration data in files.

Returning an information object of a given category for a given process object.

Providing methods for traversing through hierarchal structures and returning process objects.

Storing information about all process object, all information object information, all information category information as well as storing and providing configuration data for the individual information objects.

Each information object can be configured by the user through a graphical display. The configuration settings concern the source of the information that should be exposed by the interface. These configuration settings are stored for each information object in the information coordinator 18. The properties exposed by the information objects via their given interface can be subscribed to from graphical displays. The information objects can be accessed through the information coordinator with the information identifier. When the information object is accessed, its properties can be accessed through the interface specified by its information category.

When an information object is activated, a new instance based on the class of its category is created with the configuration parameters stored in the information coordinator for this specific information object.

Figure 6:
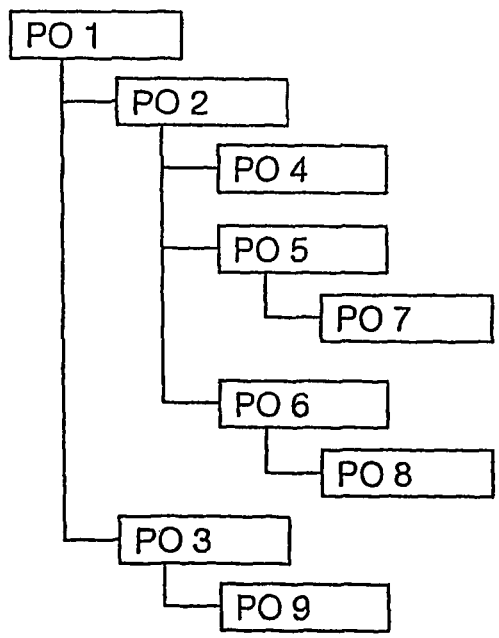
FIG. 6 shows an example of a structure of objects.
Figure 7:
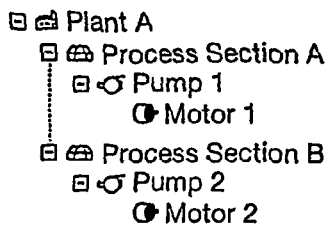
FIG. 7 shows a view displayed to the user of a structure with different objects.

Process objects can be organized in structures. The structures allow a parent-child relation to be described between the process objects. A process object can be present in several structures. FIG. 6 shows a hierarchal structure comprising nine process objects, PO1-9, arranged on four different levels. A possible organization of a structure with different process objects is shown in FIG. 7. The top level is a process object representing an entire plant. The next level comprises process objects representing process section A and process section B. On a level below process section A, a process object representing a pump is located and on the lowest level a process objects representing a motor of the pump is located. It is easy for a person to search through such a hierarchal structure, and to display a view showing more details. More details about an object are displayed by selecting the object and requesting the system to display the next lower level, for example by double clicking on the object.

Information about locations of a process object in the structures is given in a specific type of information object. The information coordinator keeps track of and stores the association between information objects and process objects.

The predefined interfaces provide a defined way of accessing the information. With a defined way of access means that properties can be accessed in a predefined manner. Information objects of an information type can be configured such that the source of the data exposed by the interface of the information object comes from a number of sources, including real-time measurements, process models, historical logs, average values. A connection can be made from the exposed values to an OPC-property. Further, the connection may be made via a known, defined interface such as the IUnknown interface according to the COM (Component Object Model) standard comprised in the software objects to provide standard interface common to all software objects used a computerised system. The information objects can also contain methods for aggregation of values, so that the exposed property, e.g. the property value, of an information object is aggregated values of a specific information type. Several different aggregation methods can be configured in the information object. A configuration of each information object of the information type is stored in a database by the information coordinator.

As shown in FIG. 3, every information object contains information about which information category it belongs to. Checking which information category it belongs to can identify which type of information an information object contains.

According to an embodiment of the invention, different object types can be defined with predefined collections of information objects. Templates are provided for the different object types. For example, an object type motor is defined and a template comprising a process object and three information objects of the categories efficiency, energy loss, and electricity consumption are associated with the process object. Thus, when a motor is added to the system, a process object of the type motor is created based on object type motor. This simplifies the population of the structures describing the plant, e.g. when creating a new object, defined information object for the object type will automatically be created.

By using the hierarchal structures, information input on higher level process objects can be distributed to lower lying objects according to a distribution algorithm.

For each information object on a process object, target parameters can be set. By using the hierarchy, a consistency check of the targets between the different levels of the structure is performed automatically. By comparing actual values with the target values, the performance can be monitored by an alarm/event generator.

An object workplace is available where the different structures can be presented, where the different views of the information objects can be presented, and where new process graphics views can be configured to display the presented information. The object workplace is a graphical user interface for access to structures, information objects and process objects.

The process objects can be organized in hierarchies. When the property source type of an information object is set to aggregate the hierarchal structures are used to evaluate the value. If the aggregation type is set to summation, the energy information object will traverse through the underlying process objects to find all information objects of the same information type. The values of these information objects will be retrieved and added together. The traversing through the structures is functionality provided by the information coordinator.

In the information objects, logical or arithmetic expressions can be set for opportunities regarding improvement in energy management operations. The logical expression can be supported by any software component, such as a process model external to the information object. The value of the expression is exposed by the information object and indicates a possibility for improved operations. Information objects can also be configured to contain information about the opportunities and also linked to more detailed description about the opportunities.

FIG. 8 shows an example of a graphical user interface according to the invention. The interface comprises means 20 for selection of which structure to be shown. Upon command, a menu displaying the available structures is shown. The interface comprises a structure displaying section, displaying the process objects arranged in the selected structure. The structure shown in FIG. 8 comprises a top level with a process object representing the entire plant, a second level having process objects representing plants in different countries, a lower level comprising process objects representing processes in the plant, such as a dryer process and a reactor process. A level below the reactor process comprises process objects representing the different reactors in the reactor process. A level below reactor 1 comprises process objects representing devices belonging to the reactor 1, for instance an agitator, a pump A and a pump B. The agitator comprises a motor and the lowest level in the structure comprises a process object representing the motor of the agitator.

Figure 8A:
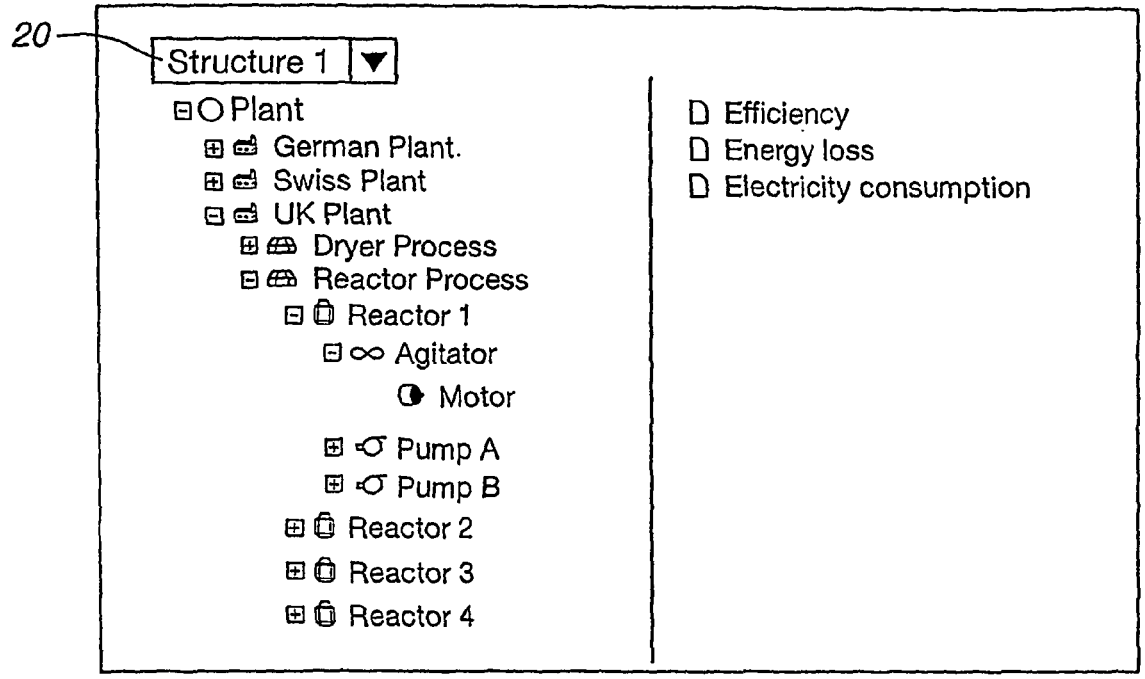
FIGS. 8a and 8b shows an example of a user interface according to an embodiment of the invention.

The user interface also comprises an information object section, displaying the information objects connected to a selected process object. A displayed process object is selected by means of any normal input means, such as using a keypad, touching a touch screen or pointing and clicking on it with a computer mouse or any other pointing means. If a process object is selected, the information objects connected to the object are shown in the information object section. As shown in FIG. 8a, the motor of the agitator is selected and the motor comprises information objects of the types efficiency, energy loss, and electricity consumption. Thus, it is possible to receive values of those information types for the selected motor. In the figure, the information object electricity consumption is selected.

Figure 8B:
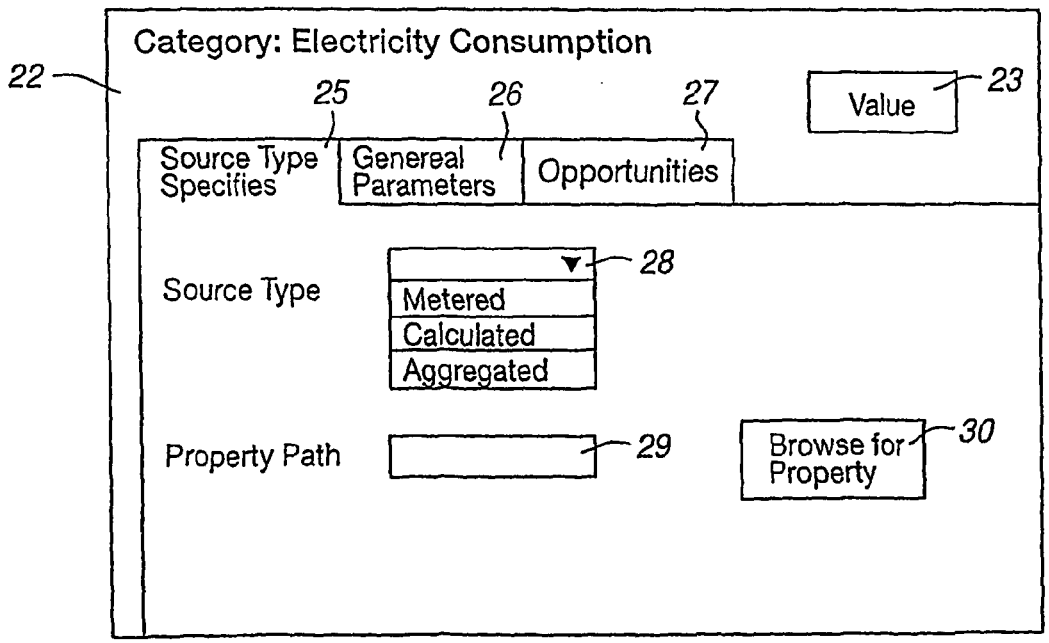

When an information object is selected, a dialog box is shown. A dialog box 22 of the information object of the category electricity consumption is shown in FIG. 8b. The dialog box 22 comprises a software button 23 named value. When the user activates the software button, a value of the electricity consumption for the process object is displayed to the user. Upon activation of the button 23 the text "value" will disappear and the actual value is displayed instead of the text.

The dialogue box further comprises tabs 25, 26, 27 providing ability to set different parameters and specify the source of information to be retrieved. In FIG. 8b, a tab 25, named source type specifics, is selected. The user can choose between the source types: metered, calculated, and aggregated. In a box named property path, the user specifies where to find the source of the information to be retrieved. For simplifying the specification of the source, a software button denoted browse-for-property 30 is provided. By selecting the browse-for-property button 30, it is possible to browse through the entire system and select the proper location for the information source.

The dialogue box further comprises a tab 24 denoted general parameters, which displays a possibility for setting a target value. FIG. 9 shows the dialogue box when the tab 27, named opportunities, is selected. It is possible to insert a short title of the opportunity and also a detailed description. The dialogue box comprises input means 32, 33 for specifying the logical or arithmetic expression for the opportunity and where to find the properties of the expression. The dialogue box also comprises a software button denoted subscribe-to-opportunity flag 35, which can be activated by the user. If the user activates the subscription, the information object exposes the value of the expression.

FIG. 10 shows possible configurations if the source type is selected to be aggregated. Which source types to be aggregated has to be specified. The source type to be aggregated is metered, calculated, or aggregated. Which process objects to be aggregated depends on the functional structure. If there is more than one structure available, the structure to be used for the aggregation has to be selected. Further, the level of aggregation has to be selected and the type of aggregation as well. Aggregation is performed for objects lying at lower levels than the level of the currently specified object, but that is not lower than the selected level. For instance, if five levels of aggregation are selected, aggregation is performed for values from all objects from level one level down up to five levels down in the structure. It is also possible to select that aggregation is performed for all lower laying objects to the current object.

FIG. 11 shows the dialog box displayed when an information object of the efficiency type is selected. As shown in the FIGS. 8 and 11, the efficiency type interface is identical to the electricity consumption type interface, except for the name of the category. A value for the efficiency of the selected process object is retrieved and displayed upon activation of a software button 40 denoted value. Upon activation of the button 40 the text value will disappear and the actual value is displayed instead of the text.

By traversing through the structure, it is possible to view information on different levels. By selecting the information object representing the entire plant, information of all different information types is retrieved for the entire plant. Examples of information available for the plant are the total electricity consumption of the plant, average efficiency in the plant, and the total emissions of $CO_2$ per year. It is also possible to view information belonging to the different information types for each of the countries and by going further down in the structure, it is possible to view information from the reactor process or the dryer process. By going further down in the structure, it is possible to view specific information for each reactor. By going down to the lowest level, it is possible to view information about each device in the plant. If a new object is added to the structure, values exposed by its information objects are automatically aggregated on a higher level.

The invention is for example implemented in an object orientated language such as C++, C#, Visual Basic or Java. The hardware necessary for the implementation is a standard computer such as a personal computer or a specialized computer.

The present invention is not limited to the embodiments disclosed but may be varied and modified within the scope of the following claims. For example an information type may comprise several pieces of energy related information and/or environmental data. An interface of an information type may comprise more than one property named value, each value being linked to a different piece of data.

In the embodiments disclosed above the same interface is used for setting the configuration data as is used for exposing the value of the information. In another embodiment different interfaces is used for setting of the configuration data and exposing the value of the information.

It is also in the scope of the claims to determine energy values for process objects in systems for generation, conversion, transmission and distribution of energy.

The invention claimed is:

1. A method for organizing and retrieving energy related information for a plurality of real world objects, the method comprising:
   defining in each real world object a number of information types, each information type representing a different kind or kinds of energy related information related to each real world object, wherein the information types comprise any one from the group of: electricity consumption, electricity production, gas consumption, efficiency, energy consumption, energy loss, and $CO_2$ emission, energy loss, specific fuel consumption, gas consumption, steam consumption, total energy consumption, energy cost, reactive power consumption, reactive power production, power quality and contribution, availability,
   providing for each real world object one or more predefined interfaces, adapted for retrieval from the real world objects of information of said information types, wherein each interface comprises at least one property denoted value that returns a value of a defined information type,
   providing process objects, representing the real world objects,
   providing information objects comprising information related to the real world objects and associating the information objects with related process objects, wherein each process object is associated with at least one information object, wherein the interfaces retrieve information of at least one of said types, wherein similar information types have similar predefined interfaces such that information of the same type is accessed in a same way for each information object independent of the process object that is a source of the information,
   arranging said process objects in a hierarchal structure comprising more than one level, so that the process objects obtain a parent-child relation,
   forming connections between information related to similar process objects, process objects at similar hierarchical levels or similar information types from different process objects,
   receiving and storing information about where to find the source or sources of the information to be retrieved via said interfaces of the information objects, wherein the interface of the information object corresponds to the interface for the information retrieved, selecting a set of information objects, a type of information, and an arithmetic operation, performing the arithmetic operation on the information for the set of information objects, and providing, upon request, information of a selected type for a selected information object via said interface of the information object, wherein the information relates to power management systems, maintenance systems, process control systems, or systems for process simulation and optimization.

2. The method according to claim 1, wherein each interface represents a different information type, wherein each of said process objects is provided with one or more interfaces for retrieval of information of different types, based on said pre-defined interfaces.

3. The method according to claim 2, wherein said providing the process objects with one or more interfaces comprises:
creating one or more software components representing different information types, each software component having an interface for retrieval of information of the type it represents, based on said predefined interfaces, and
providing the information object with one or more software components of different types by associating the software components with the information object.

4. The method according to claim 2, further comprising:
providing at least one information class defining an interface for retrieval of information, wherein at least some of said predefined interfaces are based on said information class.

5. The method according to claim 1, further comprising:
arranging said process objects in at least two different hierarchal structures, wherein at least some of the process objects belong to both structures.

6. The method according to claim 1, wherein information of a specific information type for a process object of a higher level is retrieved by retrieving information of said specific information type from process objects on a lower level or lower levels and performing one or more arithmetic operations on the retrieved information.

7. The method according to claim 1, further comprising:
distributing information from a process object on a higher level to process objects on a lower level.

8. The method according to claim 1, further comprising:
providing at least some of the information objects with at least one target value of a certain information type, and comparing an actual value of the same type with the target value and generating an alarm or an event based on the comparison.

9. The method according to claim 1, further comprising:
checking whether there is a consistency between the target of a parent process object and the targets of its child process objects.

10. The method according to claim 1, further comprising:
defining a number of information object templates, each information object template provided with one or more predefined interfaces for retrieval of information of different types and creating information objects based on said information object templates.

11. The method according to claim 1, wherein the method manages energy data in a control system controlling said real world objects.

12. The method according to claim 1, wherein the method comprises defining at least one logic and/or arithmetic expression regarding an opportunity for improvement of an energy related management operation, and providing said pre-defined interface with an indication of a possibility for improving the operation based on said logic and/or arithmetic expression.

13. The method according to claim 1, further comprising:
providing at least one predefined interface comprising at least two entries for retrieval of information of two different types.

14. The method according to claim 1, further comprising:
organizing and retrieving environmental information for said plurality of real world objects, and a number of information types are defined, representing different kind or environmental information.

15. A system for organizing and retrieving energy related information for a plurality of real world objects, the system comprising:
a computer comprising
a number of information types defined for each real world object, each information type representing different kind or kinds of energy related information related to the real world object, wherein the information types comprise any one from the group of: electricity consumption, electricity production, gas consumption, efficiency, energy consumption, energy loss, and $CO_2$ emission, energy loss, specific fuel consumption, gas consumption, steam consumption, total energy consumption, energy cost, reactive power consumption, reactive power production, power quality and contribution, availability,
at least one template comprising a definition of an interface for each real world object for retrieval from the real world objects of information of said information types, wherein each interface comprises at least one property denoted value that returns a value of a defined information type,
a process object module configured to provide process objects, representing the real world objects,
an information object module configured to provide information objects comprising information related to the real world objects and associating the information objects with related process objects, wherein each process object is associated with at least one information object, wherein the interfaces retrieve information of at least one of said types, wherein similar information types have similar predefined interfaces such that information of the same type is accessed in a same way for each information object independent of the process object that is a source of the information,
an organizational module configured to arrange said process objects in at least one hierarchal structure comprising more than one level, so that the process objects have a parent-child relation, wherein the organizational module further forms connections between information related to similar process objects, process objects at similar hierarchical levels or similar information types from different process objects,
a source defining module, adapted for receiving and storing information about where to find the source or sources of the information to be retrieved via said interfaces of the information objects,
a retrieval module configured to retrieve information of a specific information type from information objects and for performing an arithmetic operation on the retrieved information, wherein the interface of the information object corresponds to the interface for the information retrieved, an output module configured to provide, upon request, information of a selected type for a selected object via said interface of the information object, and a display configured to display the requested information, wherein the information relates to power management systems, maintenance systems, process control systems, or systems for process simulation and optimization.

16. The system according to claim 15, wherein the computer comprises a number of templates, each template representing a different information type, and said information object module is adapted for providing the information object with one or more interfaces for retrieval of information of different information types, based on said templates.

17. The system according to claim 16, wherein said process object module is arranged for producing software components of different types having interfaces for retrieval of information of different information types, based on said templates, and for providing the process object with one or more software components of different types by associating the software component with the process object.

18. The system according to claim 17, wherein the computer comprises at least one template, having an interface comprising at least two entries for retrieval of information of two different information types.

19. The system according to claim 15, wherein said process objects are arranged in at least two different hierarchal structures, wherein at least some of the process objects belong to both structures.

20. The system according to claim 15, wherein a process object on a higher level comprises means for retrieving information of a specific information type from process objects on a lower level or lower levels and for performing an arithmetic operation on the retrieved information.

21. The system according to claim 15, wherein the computer is adapted for distributing information from a process object of a higher level to process objects on a lower level.

22. The system according to claim 15, wherein the computer further comprises a target value module configured to provide the information objects with target values, for comparing an actual value and the target value with each other, and for generating an alarm or an event based on the comparison.

23. The system according to claim 22, wherein at least one template comprises a consistency checking module configured to check a consistency of targets between a parent process object and child process objects of the parent process object.

24. The system according to claim 15, wherein said template is a information object template and the system comprises a number of predefined information object templates, each information object template provided with one or more predefined interfaces for retrieval of information of different information types.

25. The system according to claim 15, wherein at least one of said templates comprises a definition of a logic and/or an arithmetic expression regarding an opportunity for improvement of an energy related management operation, and said definition of the interface comprises an output indicating the possibility for an improved energy related operation based on the outcome from said logical and/or an arithmetic expression.

26. The system according to claim 15, wherein the computer further comprises an object addition module configured to add new process objects to the hierarchal structure and means for deleting said process objects from the hierarchal structure.

27. A computer program product, comprising:
a non-transitory computer readable medium; and
software code portions recorded on the computer readable medium for performing a method for organizing and retrieving energy related information for a plurality of real world objects, the method comprising defining in each real world object a number of information types, each information type representing a different kind or kinds of energy related information related to each real world object, wherein the information types comprise any one from the group of: electricity consumption, electricity production, gas consumption, efficiency, energy consumption, energy loss, and $CO_2$ emission, energy loss, specific fuel consumption, gas consumption, steam consumption, total energy consumption, energy cost, reactive power consumption, reactive power production, power quality and contribution, availability, providing for each real world object one or more predefined interfaces, adapted for retrieval from the real world objects of information of said information types, wherein each interface comprises at least one property denoted value that returns a value of a defined information type, providing process objects, representing the real world objects, providing information objects comprising information related to the real world objects and associating the information objects with related process objects, wherein each process object is associated with at least one information object, wherein the interfaces retrieve information of at least one of said types, wherein similar information types have similar predefined interfaces such that information of the same type is accessed in a same way for each information object independent of the process object that is a source of the information, arranging said process objects in a hierarchal structure comprising more than one level, so that the process objects obtain a parent-child relation, forming connections between information related to similar process objects, process objects at similar hierarchical levels or similar information types from different process objects, receiving and storing information about where to find the source or sources of the information to be retrieved via said interfaces of the information objects, wherein the interface of the information object corresponds to the interface for the information retrieved, selecting a set of information objects, a type of information, and an arithmetic operation, performing the arithmetic operation on the information for the set of information objects, and providing, upon request, information of a selected type for a selected information object via said interface of the information object, wherein the information relates to power management systems, maintenance systems, process control systems, or systems for process simulation and optimization.

28. A human machine interface for organizing and retrieving energy related information for a plurality of real world objects, the human machine interface comprising:

a display configured to display the human machine interface, means for generating a graphical user interface on the display, the graphical user interface comprising:

a module configured to display a number of process objects representing the real world objects, the process objects being provided with one or more interfaces, adapted for retrieval from the real world objects of information of different information types related to the real world objects, wherein the information types comprise any one from the group of: electricity consumption, electricity production, gas consumption, efficiency, energy consumption, energy loss, and $CO_2$ emission, energy loss, specific fuel consumption, gas consumption, steam consumption, total energy consumption, energy cost, reactive power consumption, reactive power production, power quality and contribution, availability, a module configured to display a number of information objects comprising information related to the real world objects, wherein each process object is associated with at least one information object, each information type representing different kind or kinds of energy related information, wherein each interface comprises at least one property denoted value that returns a value of a defined information type, and wherein said process objects are arranged in at least one hierarchal structure comprising more than one level, so that the process objects have a parent-child relation, wherein similar information types have similar predefined interfaces such that information of the same type is accessed in a same way for each information object independent of the process object that is a source of the information, an input module configured to receive input information about where to find the source or sources of the information to be retrieved via each of said software object interfaces, a module configured to access information of a selected type for a selected object via the information object interface, and an module configured to display on the display one or more values for an energy type for the real world objects so represented wherein the information relates to power management systems, maintenance systems, process control systems, or systems for process simulation and optimization.

29. The man machine interface according to claim 28, further comprising:

an object addition module configured to add new process objects to the hierarchal structure, and an object deletion module configured to delete said process objects from the hierarchal structure.

30. The man machine interface according to claim 28, further comprising:

an object manipulation module configured to move the process objects within the hierarchal structure.

* * * * *